T. ISHERWOOD & W. NUTTALL.

WEFT STOP MECHANISM FOR LOOMS.

No. 6,761. Reissued Nov. 23, 1875.

WITNESSES.
John Pollitt
Edwd S. Bill

INVENTOR.
Thomas Isherwood
William Nuttall
By W. E. Simonds Atty.

N. PETERS, PHOTO-LITHOGRAPHER, WASHINGTON, D. C.

BEST AVAILABLE COPY

UNITED STATES PATENT OFFICE.

THOMAS ISHERWOOD AND WILLIAM NUTTALL, OF WESTERLY, RHODE ISLAND, ASSIGNORS, BY MESNE ASSIGNMENTS, TO THE NATIONAL WOOLEN-LOOM STOP-MOTION COMPANY, OF SAME PLACE.

IMPROVEMENT IN WEFT-STOP MECHANISMS FOR LOOMS.

Specification forming part of Letters Patent No. 138,893, dated May 13, 1873; reissue No. 6,010, dated August 11, 1874; reissue No. 6,761, dated November 23, 1875; application filed May 25, 1875.

*To all whom it may concern:*

Be it known that we, THOMAS ISHERWOOD and WILLIAM NUTTALL, of Westerly, in the county of Washington and State of Rhode Island, have invented a new and Improved Weft-Stop Motion, of which the following is a specification:

Our invention consists of a comb of one or more wires, and devices for presenting them, after the shuttle passes, behind the weft-thread and in advance of the reed, to comb the weft or filling toward the weft-fork used for throwing off the shipper-lever, and thereby insure the raising of it properly when the weft is present, the said comb and the stopping mechanism being located near the middle of the loom, or thereabout. It also consists of a novel arrangement of means for presenting the weft-fork or feeler to the weft in a suitable position in advance of the cloth, and then moving it away, so as not to interfere with the beating up of the weft by the reed.

The arrangement of the stopping mechanism at the middle of the lay saves the necessity of employing one near each edge of the warp, and it is better, because, in the latter arrangement, an end of broken weft extending to the middle of the warps, or beyond, will often raise the latch of the weft-fork and prevent the stopping of the loom.

It often happens in looms carrying several shuttles that, owing to the cutting or over-straining of the weft in particular places by the shuttle-boxes, it breaks, so that the ends are long enough to raise the latches when the stop-motion is at the side of the loom, and thus the loom is not stopped as soon as it should be. Hence, the arrangement of the stop motion at the middle of the loom is particularly desirable.

Figure 1:
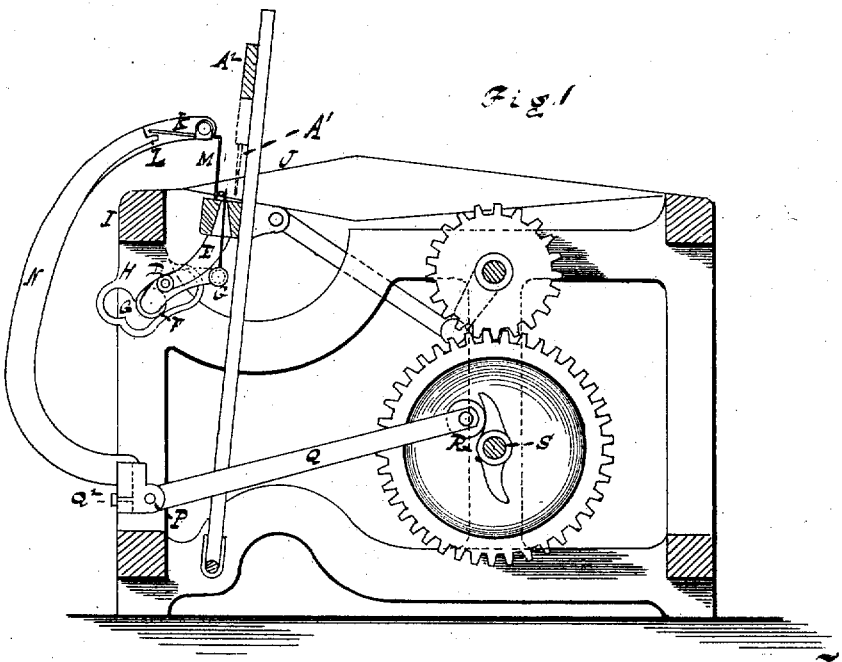
Figure 2:
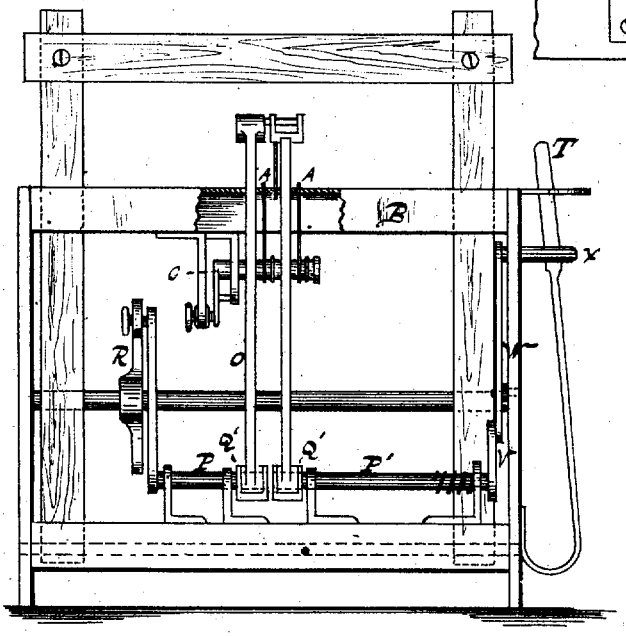
Figure 3:
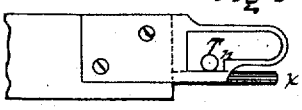

Figure 1 is an elevation in longitudinal section of a loom provided with our improved weft-stop motion. Fig. 2 is a front elevation of the same loom with a part of the front beam broken out. Fig. 3 is a detail view, showing the catch of the belt-shipper lever.

The letters A A denote two wires or a comb projecting upward through the beam B of the lathe from the free end of a rock-lever, C, pivoted at D on a bracket, E, projecting downward and forward from the lathe-beam B, and carrying at its other end the friction-roll F, which works in a cam-slot, G, of the plate H, attached to the under side of the front beam I of the loom, the slot being so shaped that, as the lathe swings forward, the wires A will be thrown up behind the weft J as soon as the shuttle has passed, and remain to carry forward and support the weft until it has held the latch K up by acting on the feeler M a sufficient length of time to pass the notch L of the lever N. The latch and the feeler are pivoted on the end of the rock-lever O on the shaft P, which has a long arm or crank, Q, operated by the cam R on the main shaft S, which is so shaped that the feeler is carried back between the warps in front of the lay immediately after the shuttle passes, and sufficiently far to be struck by the weft and pressed back by it until the latch has passed the notch L, but withdraws it in time to be out of the way of the reed at the beat up. When the weft is broken the latch falls into the notch L, so that cam R throws lever N back by means of arm Q and rock-lever O, and the lever N throws the shipper-lever T out of the notch *n* by the arm V on the end of shaft P′, rock-lever W, and the pin *x*.

The wires A and their actuating devices may be arranged above the lathe-beam, as shown in dotted lines $A^1$, the rock-lever being arranged on the upper part of the lathe—say, on the beam $A^2$—and the cam-plate H mounted on any suitable standard rising from the loom-frame. In such case, by preference, the cam-plate and the rock-lever C would be arranged at one side of the loom, while the rod B′, projecting from the free end of the rock-lever, would extend along the lathe to the middle, or thereabout; but we prefer that the wires A reciprocate through the beam B, which thus furnishes for them a retreat and support.

In practice we purpose to have the levers N and O so attached to the shafts P P′, or blocks $Q^1$ thereon, that they can be readily removed by removing a pin, $Q^2$, to facilitate the removal of the cloth from the cloth-roll.

We claim as our invention—

1. The combination, with the lathe, of the wires A and mechanism, substantially as described, for presenting them behind the weft and withdrawing them, said wires being arranged to comb the weft forward toward the cloth, in the manner set forth.

2. The reciprocating wires A and their operating mechanism, as set forth, said wires being adapted to support and carry forward the weft, in combination with the weft-fork and shipping mechanism, substantially as described.

3. The combination of the rock-lever O, arm Q, cam R, and feeler and latch with the lever N, for operating the shipper-lever, all arranged to operate in the manner described.

In witness whereof we hereto set our hands.

THOMAS ISHERWOOD.
WILLIAM NUTTALL.

Witnesses:
WM. P. COY,
THOMAS VINCENT.